United States Patent [19]

Azarovitz et al.

[11] Patent Number: 4,904,014
[45] Date of Patent: Feb. 27, 1990

[54] DECORATIVE TRIM MOLDING ASSEMBLY

[75] Inventors: Stephen J. Azarovitz, Clawson; John F. Rosenberg, Grosse Pointe Woods; Leonard R. Skupinski, Livonia, all of Mich.

[73] Assignee: General Motors Corporation, Detroit, Mich.

[21] Appl. No.: 240,039

[22] Filed: Aug. 26, 1988

[51] Int. Cl.⁴ .............................................. B60J 1/00
[52] U.S. Cl. .................................... 296/146; 296/201; 296/93; 52/717.1
[58] Field of Search ................... 296/201, 146, 93; 428/31; 52/716, 717.1, 718.1, 208, 211, 213, 287, 288, 400, 397

[56] References Cited

U.S. PATENT DOCUMENTS

| | | | |
|---|---|---|---|
| 1,961,352 | 6/1934 | Hall | 296/201 X |
| 2,612,972 | 10/1952 | Heimgartner et al. | 52/400 |
| 3,323,181 | 6/1967 | Seckerson | 52/718.1 X |
| 3,338,007 | 8/1967 | Draplin | 52/400 X |
| 3,417,439 | 12/1968 | Seckerson | 52/718.1 X |
| 3,426,394 | 2/1969 | Poupitch | 52/717.1 X |
| 4,401,340 | 8/1983 | Ankrapp et al. | 296/93 |
| 4,436,337 | 3/1984 | Bowes et al. | 296/93 X |
| 4,487,448 | 12/1984 | Griffin | 296/146 |

FOREIGN PATENT DOCUMENTS

| | | | |
|---|---|---|---|
| 291017 | 11/1988 | European Pat. Off. | 296/201 |
| 195416 | 11/1984 | Japan | 296/93 |
| 127318 | 1/1950 | Sweden | 296/93 |
| 2049010 | 12/1980 | United Kingdom | 52/400 |

*Primary Examiner*—Margaret A. Focarino
*Assistant Examiner*—Joseph D. Pape
*Attorney, Agent, or Firm*—William A. Schuetz

[57] ABSTRACT

A decorative trim molding assembly for a stationary quarter window of an automotive vehicle. The modling assembly comprises a plastic panel or bezel surrounding the quarter window and a generally C-shaped reveal molding attached thereto. The panel or bezel is molded so as to have a longitudinally extending recess on one side and first and second longitudinally offset barbed fasteners facing opposite each other and formed integral with side walls defining the openings through the panel and extending upwardly from the bottom of the recess. The C-shaped molding is attached to the panel by force fitting the curled ends of the molding over the barbs of the fasteners.

5 Claims, 2 Drawing Sheets

DECORATIVE TRIM MOLDING ASSEMBLY

The present invention relates to a decorative trim molding assembly and, more particularly, to a decorative trim molding assembly for use with a quarter rear window of an automotive vehicle.

Certain model automotive vehicles, such as the 1988 model Pontiac Grand Am Coupe, manufactured by the assignee of the present invention, have rear quarter windows which are encapsulated or surrounded by a decorative plastic panel or bezel to which a metal reveal or scalp molding is attached. These metal scalp moldings are formed to be C-shaped and have attachment clips inserted in their open sides at spaced longitudinal locations therealong. This is done by placing the molding face down in a suitable fixture and inserting the clips. Thereafter, the molding with attached clips is removed from the fixture by an operator and attached to the decorative panel by inserting the curled ends of the C-shaped molding into an elongated recess in the panel or bezel and the clips through slots formed in the panel. The operator then taps the molding with a rubber mallet to secure the scalp molding in place as a result of the clips being snap fittingly forced through the slots.

In accordance with the provisions of the present invention, a novel decorative trim molding assembly is provided in which a C-shaped decorative reveal molding can be attached to a decorative panel or bezel, such as a metal scalp molding to a plastic rear quarter window panel or bezel, without the need for any separate attachment clips or the need for fixtures to attach any clips to the reveal or scalp molding. This is achieved by molding the decorative panel so that it has a longitudinally extending recess on its outer side, a plurality of longitudinally spaced slots extending therethrough from the bottom of the recess to the back side of the panel and first and second longitudinally offset barbed fasteners facing opposite each other and formed integral with side walls defining the slots through the panel and which extend into the recess. The C-shaped molding is then attached to the panel by force fitting the curled ends of the molding over the barbs of the fasteners, the fasteners being deflectable from a normal free state position toward the center of the recess as the molding is forced over the barbs until the curled ends clear the barbs whereupon the self biasing forces of the fasteners return the same toward their normal free state position to retain the molding in place on the panel.

Accordingly, it is a broad object of the present invention to provide a new and improved decorative trim molding assembly in which a C-shaped decorative reveal molding can be directly attached to a decorative panel or bezel, preferably a metal scalp molding to a plastic rear quarter window panel or bezel, without the need of separate attachment clips and without the need for any fixtures in order to attach the clips to either of the moldings.

Another object of the present invention is to provide a new and improved decorative trim molding assembly, as defined in the preceding object, and in which the decorative panel or bezel is molded so as to have a longitudinally extending recess on its outer side, a plurality of longitudinally spaced slots therethrough extending from the bottom of the recess toward the back side of the panel and first and second longitudinally offset or staggered barbed fasteners facing opposite each other and formed integral with the side walls defining the slots through the panel and which extend into the recess, and in which the C-shaped molding is attached to the panel by force fitting its curled ends over the barbs of the fasteners, the latter being deflectable from a normal free state position toward the center of the recess as the molding is forced over the barbs until the curled ends clear the barbs where upon the self biasing forces of the fasteners return the same toward their normal free state position in which the barbs will be located behind the curled ends to retain the reveal molding in place on the panel.

Yet another object of the present invention is to provide a new and improved decorative trim molding assembly, as defined in the next preceding object, and in which the barbed fasteners are shaped so as to exert a biasing force against the curled ends of the reveal molding to biasingly retain the same in engagement with the bottom of the recess as well as the side walls of the recess.

A further object of the present invention is to provide a new and improved decorative trim molding assembly, as defined in the next preceding object, and in which the fasteners include a generally U-shaped base portion whose legs are formed integral with the side walls of the panel defining the slot and whose bight portion is spaced inwardly from the side walls of the panel defining the slot and a barbed projection formed integral with the bight portion and extending transversely thereof and in which the barbed fasteners are deflectable past a plane through the center of the recess as the curled ends of the reveal molding pass over the barbs, the passing through the center plane being allowable due to the longitudinal offset or staggered locations of the first and second fasteners.

The present invention further resides in various novel constructions and arrangement of parts, and further objects, novel characteristics and advantages of the present invention will be apparent to those skilled in the art to which it relates and from the following detailed description of the illustrated, preferred embodiment thereof made with reference to the accompanying drawings forming a part of this specification and in which similar reference numerals are employed to designate corresponding parts throughout the several views, and in which.

The present invention provides a novel decorative trim molding assembly A. Although the novel decorative trim molding assembly A of the present invention could be used in a wide variety of applications, it is particularly suitable for automotive use, such as for a rear quarter window 10 of an automotive vehicle 12. Accordingly, the novel decorative trim molding assembly A of the present invention will be described as being used for the latter purpose.

Figure 1:
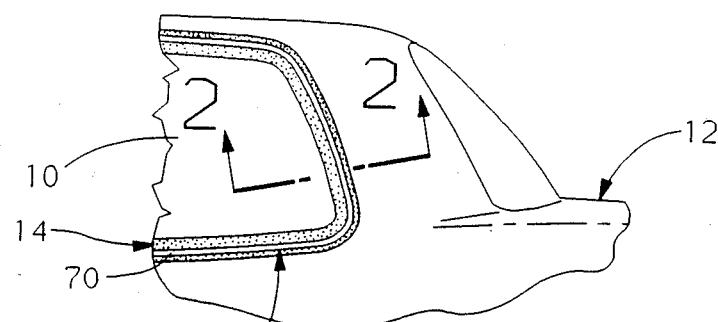
FIG. 1 is a fragmentary side elevational view of an automotive vehicle and showing its quarter window with the novel decorative trim molding assembly of the present invention.

Referring to FIG. 1 of the drawings, the novel decorative molding assembly of the present invention is thereshown as being used in conjunction with a rear quarter window 10 of an automotive vehicle 12. The molding assembly A would include a rear quarter window panel or bezel 14, preferably made from a suitable or conventional substantially rigid plastic material, which is formed or molded so as to surround the peripheral edge portions of the rear quarter window 10. The bezel 14 is, preferably, adhesively secured to the outer peripheral portions of the window 10. The rear quarter panel or bezel 14 is itself decorative and is adapted to be attached to the vehicle body structure surrounding the rear quarter window 10 in any suitable or conventional manner.

Figure 2:
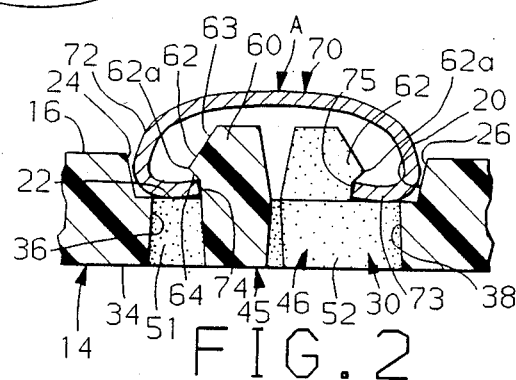
FIG. 2 is an enlarged cross sectional view taken along the arrows 2—2 of FIG. 1.

The decorative trim panel or bezel 14 has a smooth, generally planar outer surface 16 and has a peripheral shape which is the same as the peripheral shape of the window 10, as best shown in FIG. 1. The bezel 14 is provided with a peripheral or longitudinally extending recess 20 in its front or outer side 16. The recess 20 is of a predetermined depth and includes a bottom or bottom wall 22 and first and second side walls 24 and 26, as best shown in FIG. 2. The bottom wall 22 is planar and the side walls 24 and 26 are planar, but tapered so that they diverge outwardly from their innermost ends towards their outermost ends at the outer side or surface 16.

Figure 3:
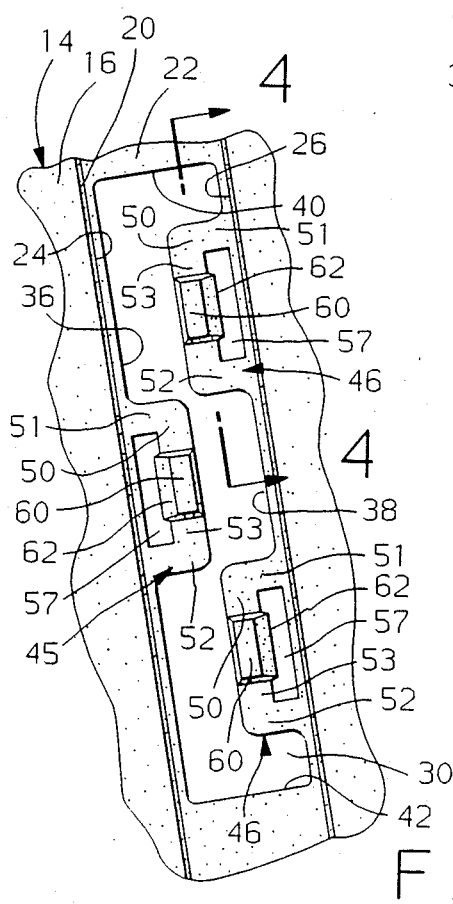
FIG. 3 is a side elevational view of part of the decorative trim molding assembly of the present invention.
Figure 4:
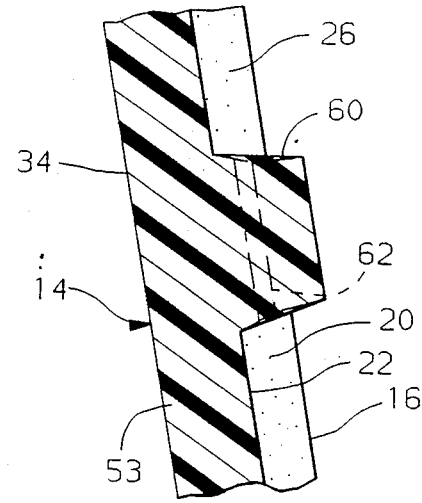
FIG. 4 is an enlarged fragmentary sectional view taken along the lines 4—4 of FIG. 3.

In addition, the bezel 14 is provided with a plurality of longitudinally spaced slots 30 therethrough. The slots 30 extend through the bezel 14 from the bottom 22 of the recess 20 to the back side 34 of the bezel 14 which faces opposite to the outer side 16. The slots 30 are defined by side walls 36 and 38 and end walls 40 and 42, as best shown in FIG. 3. The slots 30 are thus longitudinally aligned with the recess 20.

The bezel 14 also has first and second fasteners or tabs 45 and 46 formed integral therewith. The fasteners 45 are formed integral with the side wall 36 defining the slot 30 and the fasteners 46 are formed integral with the side wall 38 defining the slot 30. As best shown in FIG. 3, the fasteners 45 and 46 are also longitudinally offset or staggered, and for a reason to be hereinafter more fully described.

The fasteners 45 and 46 are of an identical construction or configuration, except that they face in opposite directions from each other, and corresponding parts thereof will be given the same reference numerals. The fastener 45 comprises a generally U-shape base portion 50 integral with the side wall 36 and has a pair of spaced legs 51 and 52 and a transverse or bight 53. The base 50 at its upper side, as best viewed in FIG. 2, lies in the same plane as the bottom 22 of the recess 20 and the base 50 has a bottom surface which lies in the same plane as the back side 34 of the panel 14. The base 50 defines with the side wall 36 an elongated slot 57 so that the bight 53 is spaced laterally inwardly from the side wall 36. The provision of the slot 57 enables the legs 51 and 52 of the base to be more flexible than would be the case if the base was one solid member with the side wall 36.

The fastener 45 also includes a barbed projection or pedestal 60 formed integral with the bight 53 intermediate its ends and which extends normal thereto and into the recess 20 of the panel 14. The projecting portion 60 has a barb 62 defined by tapered upper and lower surfaces 63 and 64 which converge towards each other.

The barb 62 extends transversely of the portion 60 and has a sharp apex 62a, as viewed in cross section in FIG. 2.

The fastener 46 is of an identical construction to the fastener 45 except that it has its barb 62 facing in the opposite direction toward the side wall 26 of the recess 20 whereas the barb 62 of the fastener 45 faces toward the side wall 24 of the recess 20.

As can be best seen in Figure , the fasteners 45 and 46 lie on opposite sides of a plane extending longitudinally of the recess 20 and extending perpendicular to the bottom surface 22 thereof. The fasteners 45 and 46 are also staggered or offset longitudinally of the slot 30 or recess 20 so that if deflected inwardly they will not interfere with each other.

The novel decorative trim assembly also includes a generally C-shaped outer decorative reveal or scalp molding 70. The reveal molding 70 is preferably made from a suitable metal material and is of a conventional construction. The molding 70 would have an outer finished or chrome surface and includes inwardly curled end portions 72 and 73, as best shown in FIG. 2. The decorative molding 70 is adapted to be positioned within the recess 20 of the rear window quarter panel or bezel 14 and serves as a decorative molding between its inner end adjacent the window and its outer end adjacent the vehicle body.

The inwardly curled end portions 72 and 73 of the molding 70 terminate in free ends 74 and 75, which free ends 74 and 75 are spaced apart a predetermined transverse distance T' and which define a longitudinally extending slot 78. The apices 62a of the barbs 62 of the fasteners 45 and 46 lie in spaced planes extending longitudinally of the recess 20 and normal to its bottom 22 which are spaced apart a distance T', as measured perpendicularly between the planes, which is greater than the predetermined distance T between ends 75 and 74 of the end portions 73 and 72 of the reveal molding 70.

Figure 5:
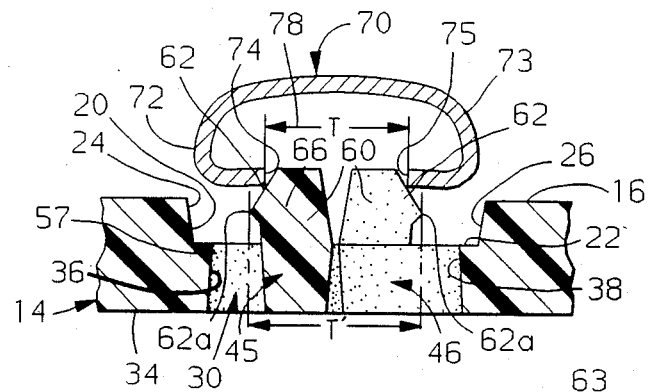
FIGS. 5-8 are fragmentary sectional views like that shown in FIG. 2, but illustrating the positions of the different parts as part of the decorative reveal molding is attached to the panel or bezel of the decorative trim molding assembly.
Figure 6:
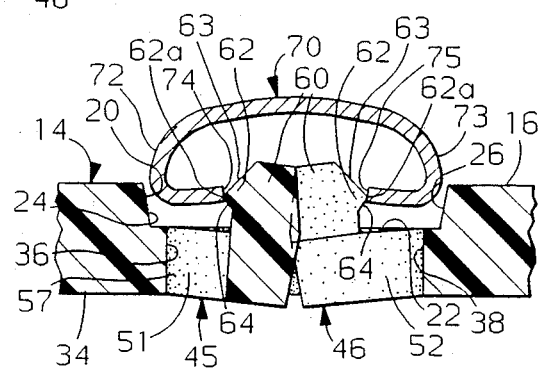
Figure 7:
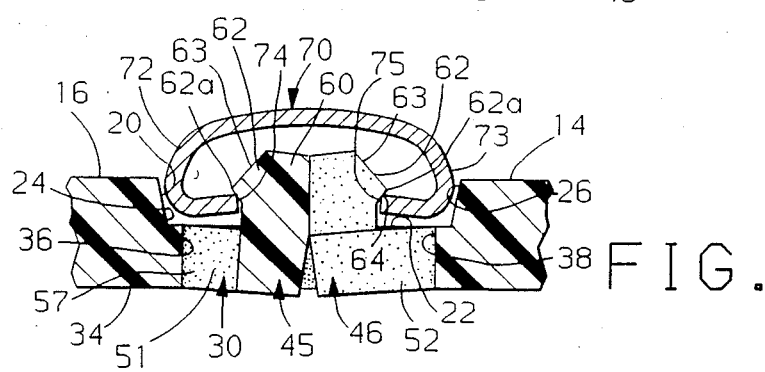
Figure 8:
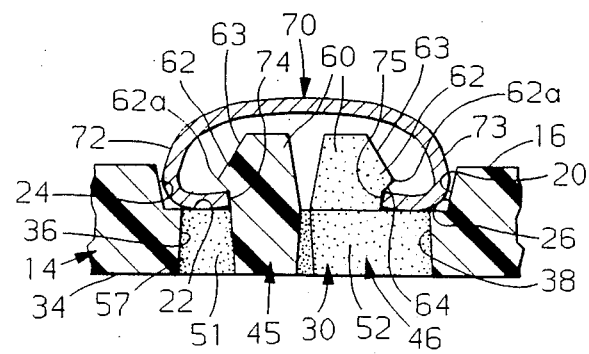

The reveal molding 70 is adapted to be force or press fitted over the barbed projections 60 of the fasteners 45 and 46. As best shown in FIG. 5, the reveal molding 70 is initially positioned so that its ends 74 and 75 engage the tapered upper surfaces 63 of the barbed projections 60 of the fasteners 45 and 46. Thereafter, the operator presses down on the reveal molding 70, as viewed in FIGS. 6 and 7. As the reveal molding 70 is pressed down, the ends 74 and 75 cause the fasteners 45 and 46 to be deflected inwardly toward and past the vertical longitudinal center plane of the opening 30, as shown in FIG. 6. The end portions 72 and 73 of the molding may also be deflected slightly away from each other. The fasteners 45 and 46 will deflect inwardly as the result of the legs 51 and 52 of the base portions 50 thereof deflecting and moving downwardly, as shown in FIG. 6. This movement continues until the ends 74 and 75 clear the barbs 62, as shown in FIG. 7, whereupon the fasteners 45 and 46, due to their self-biasing forces, will return to their normal free state position and the barbs 62 along their lower tapered surfaces 64 thereof will engage the ends 74 and 75 of the reveal molding 70. These self biasing forces returning the fasteners 45 and 46 toward their normal free state position, as shown in FIG. 5, will cause the end portions 72 and 73 of the molding 70 to be moved into engagement with the bottom surface 22 of the recess as well as cause the end portions 72 and 74 to be moved outwardly toward engagement with the tapered side walls 24,26 of the recess 20. This latter position is shown in FIG. 8.

From the foregoing, it should be readily apparent that a novel decorative trim molding assembly A has been provided which does not require any separate fastener clips and which is of a novel two piece construction. By forming the barbs projections 60 integral with the bezel 14 by providing a U-shaped base portion which can be deflected, and by biasingly engaging the opposite ends 74 and 75 of the reveal molding to bias the same downwardly into engagement with the bottom surface 22 and toward engagement with the side walls 24,26, a secure attachment or retention of the reveal moldings 70 onto the bezel 14 is provided.

Although the illustrated embodiment thereof has been described in great detail, it should be apparent that certain modifications, changes and adaptations may be made in the illustrated embodiment, and that it is intended to cover all such modifications, changes and adaptations which come within the spirit of the present invention.

The embodiments of the invention in which an exclusive property or privilege is claimed are defined as follows:

1. In combination, a reveal plastic panel for an automotive vehicle, a generally C-shaped decorative reveal molding having curled end portions whose interior surfaces face towards each other, said end portions terminating in free ends which are spaced from each other a predetermined distance to define a slot extending longitudinally of the molding, and means for snap fittingly attaching and retaining said reveal molding onto said panel, the improvement being that said panel has front and back sides, said front side of said panel having a longitudinally extending recess which is defined by a bottom surface and first and second laterally spaced side surfaces, said panel having a plurality of longitudinally spaced slots therethrough extending from the bottom surface of said recess to the back side thereof, said panel having first and second fasteners formed integral therewith and located within said slots at longitudinally spaced locations, said fasteners comprising a base portion integral with an adjacent side wall of said panel defining said slot and lying within said slot said fasteners further comprising a barbed projection integral with said base portion at a location remote from said side wall defining said slot, said barbed projections extending transversely of said base portion and slot toward said front side of the panel and being located above the plane of said bottom surface of said recess in said panel, said projections having upper and lower tapered surfaces which converge towards each other to define a barb having an apex facing toward one of said side surfaces of said recess, but being spaced therefrom, said apices of said first and second fasteners when the latter are in a free state position free of any externally imposed forces lying in spaced parallel planes and with the perpendicular distance between the planes being greater than said predetermined distance between said free ends of said C-shaped reveal molding, said molding being attachable to said panel by force fitting said curled end portions of said molding over said barbed projections and with the projections of said first and second fasteners being deflectable from their free state position towards each other as the curled ends are moved into engagement with said projections until said ends of said curled end portions pass over said barbs whereupon said projections will return back toward their free state position to biasingly retain said curled end portions against the bottom surface of said recess and toward engagement with the side surfaces of said recess to retain said molding in place on said panel.

2. In combination, a quarter window panel which surrounds a quarter window of an automotive vehicle and has outer and back sides, a C-shaped reveal molding having curled end portions facing towards each other, said curled end portions terminating in free ends which are spaced from each other a predetermined distance to define a slot extending longitudinally of the molding, and means for snap fittingly retaining said reveal molding onto said panel, the improvement being that said panel has a recess in its outer side surrounding said window defined by a bottom having a plurality of longitudinally spaced openings therethrough and first and second laterally spaced sides, said panel having first and second fasteners formed integral with opposite side walls defining said openings, said first and second fasteners being offset from one another in a longitudinal direction of said recess in said panel and comprising a base portion disposed within said opening and a barbed projection extending transversely of said base portion and into said recess, said projections of said first and second fasteners having a barb whose apex faces towards said first and second side walls of said recess, respectively, said apices of said first and second fasteners, when the latter are in a free state position free of any externally imposed forces, lying in spaced parallel planes and with the perpendicular distance between the planes being greater than said predetermined distance between said free ends of said C-shaped reveal molding, said molding being attachable to said panel by force fitting said curled end portions of said molding over said barbed projections and with the curled end portions being deflectable away from each other and said projections of said first and second fasteners being deflectable from their said free state positions towards each other as the curled end portions are moved into engagement with said projections until said free ends of said curled end portions pass over said barbs whereupon said projections move back toward their said free state position to biasingly retain the curled end portions against the bottom of said recess and toward engagement with the side walls of said recess to retain said molding in place on said panel.

3. In combination, as defined in claim 2, and wherein said projections on said fasteners have tapered upper surfaces and tapered lower surfaces which converge toward each other to define said barbs.

4. In combination, as defined in claim 3, and wherein said base portion is generally U-shaped and has its legs integral with the adjacent side wall portion defining the slot and a bight portion spaced from said side wall portion, said legs being deflectable when said reveal molding is force fitted over the barbed projections.

5. In combination, as defined in claim 4, and wherein the base portion of said fasteners has an upper surface which lies in the same plane as the bottom of said recess and a lower surface which lies in the same plane as the back side of said panel.

* * * * *